United States Patent
Seely et al.

(10) Patent No.: US 11,902,170 B2
(45) Date of Patent: Feb. 13, 2024

(54) SYSTEM AND METHOD FOR ADAPTIVE BUFFER MANAGEMENT

(71) Applicant: Hewlett Packard Enterprise Development LP, Houston, TX (US)

(72) Inventors: Jonathan Michael Seely, Cool, CA (US); Steven Glen Jorgensen, Newcastle, CA (US); Joseph D. Gleason, Lincoln, CA (US)

(*) Notice: Subject to any disclaimer, the term of this patent is extended or adjusted under 35 U.S.C. 154(b) by 336 days.

(21) Appl. No.: 17/465,507

(22) Filed: Sep. 2, 2021

(65) Prior Publication Data

US 2023/0068902 A1 Mar. 2, 2023

(51) Int. Cl.
H04L 47/30 (2022.01)
H04L 47/60 (2022.01)
H04L 47/12 (2022.01)

(52) U.S. Cl.
CPC ............ H04L 47/30 (2013.01); H04L 47/12 (2013.01); H04L 47/60 (2013.01)

(58) Field of Classification Search
CPC ............................... H04L 47/30; H04L 47/60
See application file for complete search history.

(56) References Cited

U.S. PATENT DOCUMENTS 10,536,385 B2 * 1/2020 Seely .................. H04L 49/3027

* cited by examiner

Primary Examiner — Siming Liu
(74) Attorney, Agent, or Firm — Park, Vaughan, Fleming & Dowler LLP

(57) ABSTRACT

One aspect of the instant application provides a system and method for managing a switch buffer. During operation, the system establishes a hierarchical accounting structure to determine utilizations of different elements of a buffer on the switch. The hierarchical accounting structure comprises one or more parent elements, and each parent element is associated with one or more child elements. The system determines a base utilization of a child element based on an amount of buffer space allocated to the child element and an amount of buffer space used by the child element, and determines an adaptive utilization of the child element based at least on the base utilization of the child element and a congestion state of a corresponding parent element. Determining the adaptive utilization of the child element comprises performing a table lookup operation. The system then stores a received packet associated with the child element in the buffer in response to the adaptive utilization of the child element being less than a predetermined threshold.

20 Claims, 12 Drawing Sheets

FIG. 6

| PARENT UTILIZATION | TRANSLATED INDICES |
|---|---|
| 0 | 0 |
| 1-8 | 1 |
| 9-16 | 2 |
| 17-24 | 3 |
| 25-32 | 4 |
| 33-40 | 5 |
| 41-48 | 6 |
| 49-56 | 7 |
| 57-66 | 8 |
| 67-70 | 9 |
| 71-74 | 10 |
| 75-78 | 11 |
| 79-82 | 12 |
| 83-86 | 13 |
| 87-90 | 14 |
| 91-94 | 15 |
| 95-98 | 16 |
| 99-100 | 17 |
| 101-102 | 18 |
| 103-104 | 19 |
| 105-106 | 20 |
| 107-108 | 21 |
| 109-110 | 22 |
| 111-112 | 23 |
| 113-114 | 24 |
| 115-116 | 25 |
| 117-118 | 26 |
| 119-120 | 27 |
| 121-122 | 28 |
| 123-124 | 29 |
| 125-126 | 30 |
| 127 | 31 |

FIG. 7

| Address Bits | | | | | | | | | | | |
|---|---|---|---|---|---|---|---|---|---|---|---|
| 0 | 1 | 2 | 3 | 4 | 5 | 6 | 7 | 8 | 9 | 10 | 11 |
| Child | | | | | Parent | | | | Bias | | |

| Address Bits | | | | | | | | | | | |
|---|---|---|---|---|---|---|---|---|---|---|---|
| 0 | 1 | 2 | 3 | 4 | 5 | 6 | 7 | 8 | 9 | 10 | 11 |
| Child | | | | | | | Parent | | | | |

| Address Bits | | | | | | | | | | | |
|---|---|---|---|---|---|---|---|---|---|---|---|
| 0 | 1 | 2 | 3 | 4 | 5 | 6 | 7 | 8 | 9 | 10 | 11 |
| Child | | | | | | | Bias | | | | |

FIG. 9

SYSTEM AND METHOD FOR ADAPTIVE BUFFER MANAGEMENT

BACKGROUND

Field

This disclosure is generally related to buffer management in a switch. More specifically, this disclosure is related to a system and method that adaptively determine congestion state of queues in a switch based on the overall congestion on the switch.

BRIEF DESCRIPTION OF THE FIGURES

FIG. 6 illustrates exemplary lookup tables for different bias values, according to one aspect of the application.

FIG. 7 shows an exemplary scenario where 128 parent utilization values are translated to 32 indices, according to one aspect of the application.

FIG. 9 illustrates various exemplary formats of the lookup address, according to one aspect of the application.

In the figures, like reference numerals refer to the same figure elements.

DETAILED DESCRIPTION

Figure 1:
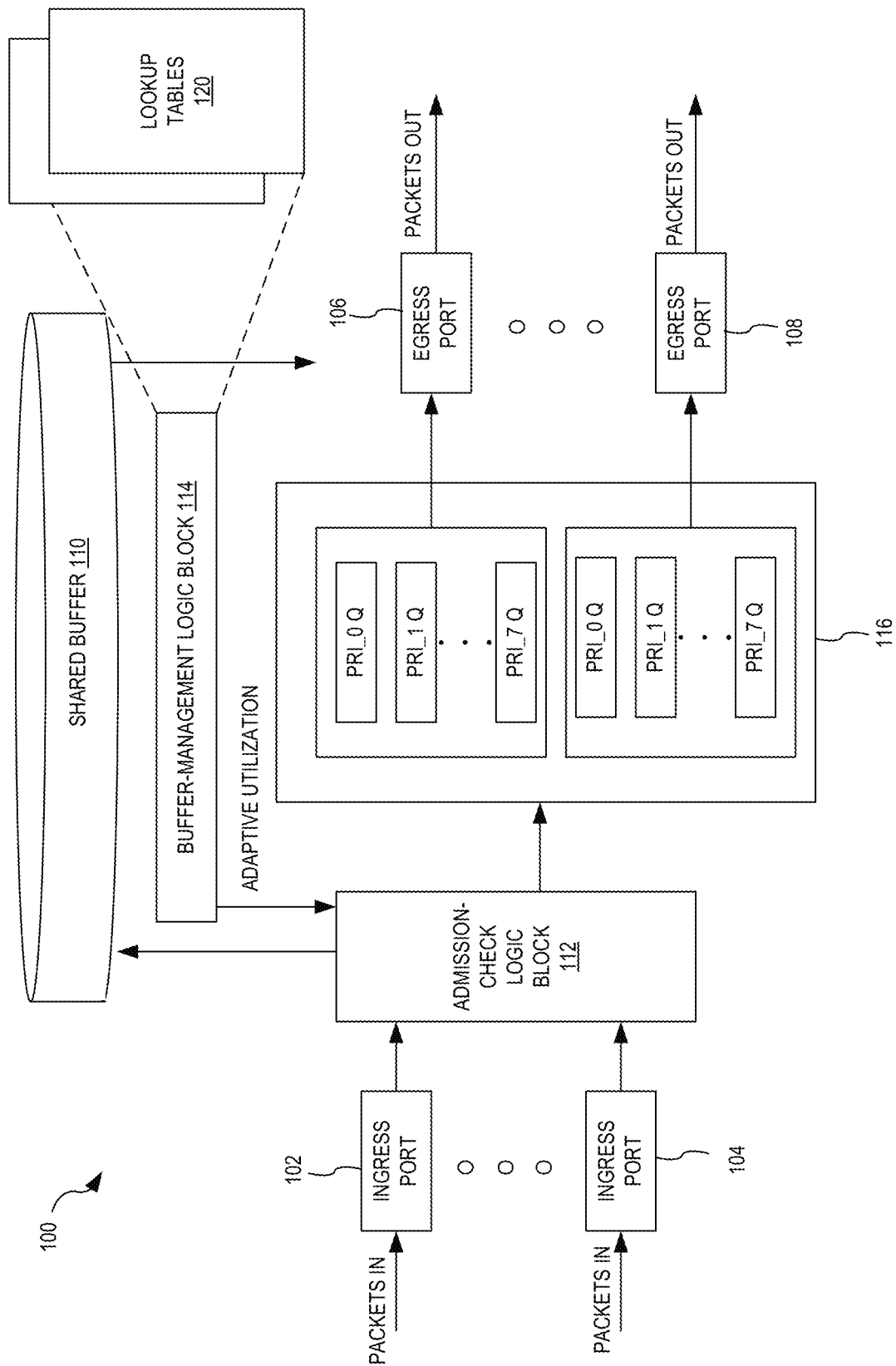
FIG. 1 illustrates an exemplary buffer management architecture, according to one aspect of the instant application.

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

Due to latency and bandwidth constraints, packets arriving at a switch are typically buffered before they are transmitted or dropped. Efficient usage of the limited buffer space on the switch can increase the throughput of the switch. In legacy network switch architectures, buffer usage was primarily governed with fixed allocation per queue with a portion of the buffer allocated as a shared resource among all queues. Generally, the shared portion of the buffer was distributed as "first come, first served" and each queue would have some predetermined limitation defining the maximum amount of resources they were allowed to consume from the shared pool. For example, for each incoming packet, an admission decision is made depending on the accounting state of the queue into which the packet will be inserted. If utilization of the queue was under its fixed allocation amount (guaranteed buffer resources that were pre-allocated for this queue), then the packet would be accepted. If utilization of the queue was over its fixed allocation amount, then the admission check would look at the queue's usage and limitations of the shared pool. If the queue was under its predefined limitation of the shared pool and there were shared buffer resources available, then the packet would be accepted. Resources in the shared buffer may not be available even though the queue itself did not use its entire shared amount. If these checks failed, then the packet would be discarded.

This conventional buffer management scheme was sufficient for smaller scale network switches with a small number of queues. However, for large scale network switches implementing the virtual output queuing (VOQ) architecture, the number of queues can reach tens of thousands as the number of attributes in which packets are classified and stored increases. Having such a large number of queues makes it difficult to support fixed allocation of buffer space and requires most of the buffer to be treated as shared. Managing fair usage of the shared buffer across all queues also became increasingly difficult.

According to one aspect of the invention, when managing buffer space (e.g., determining the amount of buffer each queue can utilize), the buffer management system can make decisions that are adaptive to the current state of the buffer. This means that the amount of buffer space a queue may consume can be adaptive based on what else is occupying the buffer. For example, if the buffer is relatively underutilized, then each queue can reach their maximum potential; if the buffer is congested, then each queue's potential can be dynamically lowered. In other words, the utilization of a queue not only depends on the actual buffer space occupied by content in this queue but also depends on the utilization of the entire buffer. A congested buffer can result in a queue reaching its full utilization much more quickly. Note that utilization of a queue directly correlates to the admission decision made for packets entering the queue. When a queue is congested (i.e., utilization reaches a predetermined threshold), an incoming packet to be queued in this queue will be dropped.

FIG. 1 illustrates an exemplary buffer management architecture, according to one aspect of the application. In this example, it is assumed that a switch 100 implements the virtual output queue (VOQ) architecture where each output port has dedicated queues. In FIG. 1, switch 100 includes a number of ingress ports (e.g., ports 102 and 104), a number of egress ports (ports 106 and 108), a shared buffer 110, an admission-check logic block 112, a buffer-management logic block 114, and a queuing system 116.

The ingress ports receive packets from connected devices (e.g., computers, access points, other switches, etc.), and the egress ports transmit packets to connected devices. Shared buffer 110 temporarily stores packets received from the ingress ports until they are transmitted out of the egress ports. Admission-check logic block 112 can be responsible for determining whether an incoming packet should be accepted and written into shared buffer 110 or discarded. Buffer-management logic block 114 is responsible for governing buffer usage. More specifically, buffer-management logic block 114 can control the decisions of admission-check logic block 112 (e.g., by controlling attributes that affect decisions of admission-check logic block 112). Queuing system 116 can include a number of queues, with one or more queues assigned to each egress port. Queuing system 116 organizes the buffered packets into queues that can be used to decide which packet is the next to be pulled from the buffer and sent out via a corresponding egress port.

In the example shown in FIG. 1, the buffer management architecture (including shared buffer 110, admission-check logic block 112, buffer-management logic block 114, and queuing system 116) can organize and regulate access to oversubscribed resources (e.g., the egress ports). For example, if switch 100 receives 100 packets in 1 μs but can only output 50 packets in the 1 μs period, then 50% of the received packets need to be buffered (e.g., in shared buffer 110) and queued (e.g., in queuing system 116), until the remaining packets can be processed and outputted by switch 100. The size of the buffer is limited and continued oversubscription will ultimately lead to packet drops due to the buffer filling up. Efficient usage of the buffer space can reduce the packet dropping rate.

Note that not all packets are treated the same. The order in which buffered packets are organized for service can vary depending on the architecture, but it is generally determined by a certain fixed set of attributes, such as the packet's source address, the packet's destination address, the priority classification of the packet, etc. For example, if two packets with different priority classifications are competing for the same buffer resource, the packet with a lower priority will be dropped while the packet with a higher priority will be accepted to the buffer.

According to one aspect of the invention, buffer-management logic block 114 can provide adaptive utilization of the various queues to admission check logic block 112, thus facilitating admission check based on the adaptive utilization of the various queues. More specifically, buffer-management logic block 114 can access a set of lookup tables 120 to obtain the adaptive utilization of the various queues.

Accordingly to a further aspect, in addition to considering the overall state of the buffer when determining utilization of a queue, the buffer management system may consider the congestion state of a parent unit of the queue (e.g., the port to which the queue belongs or a group of queues including the queue). More specifically, the buffer management system can use a hierarchical accounting structure to divide usage of the shared buffer into groups, with each group being further divided into subgroups, and so on, until the smallest unit (i.e., the final physical queue) is reached.

Figure 2:
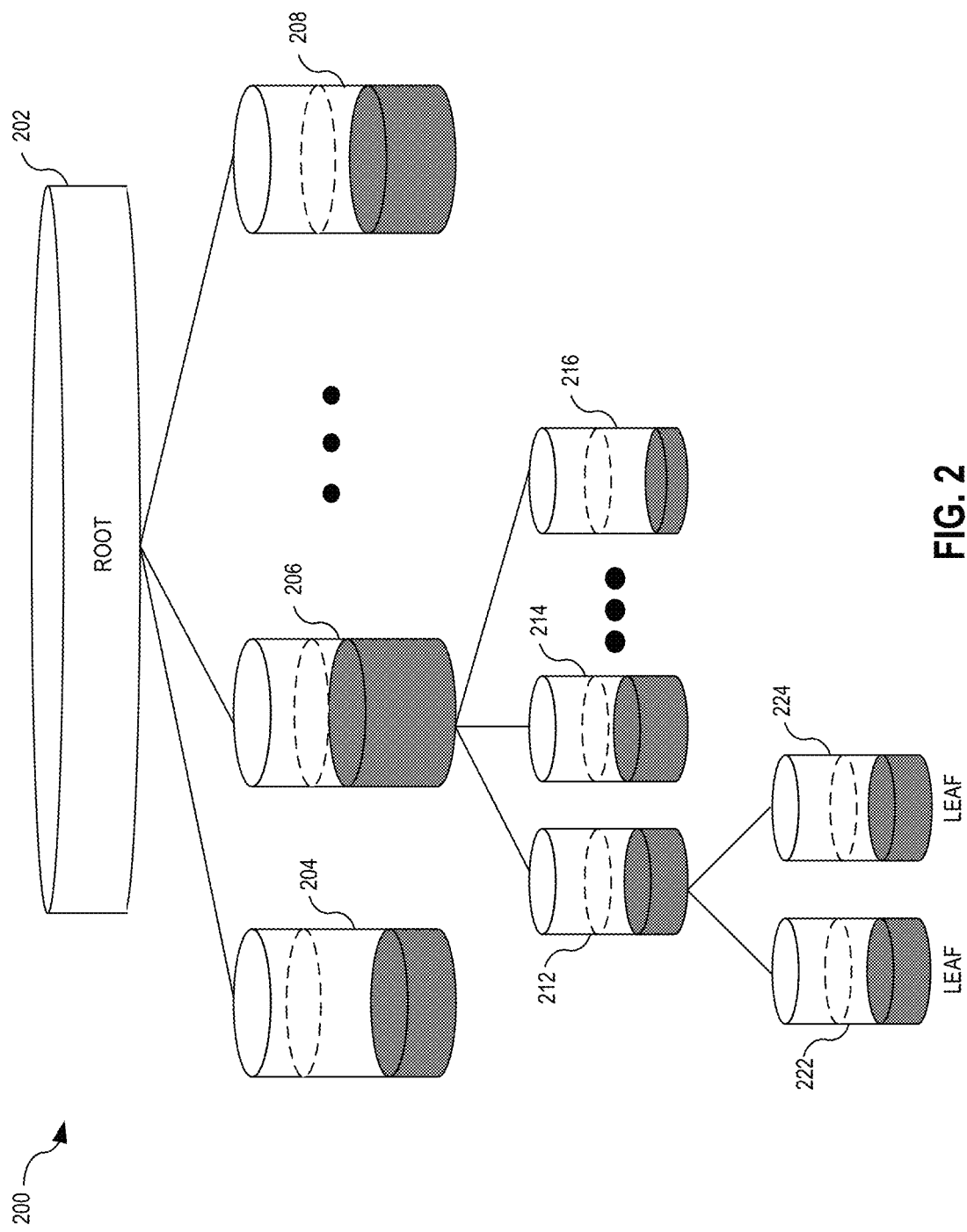
FIG. 2 illustrates an exemplary hierarchical accounting structure for buffer management, according to one aspect of the instant application.

FIG. 2 illustrates an exemplary hierarchical accounting structure for buffer management, according to one aspect of the instant application. In FIG. 2, usage of the shared buffer can be organized into a tree structure 200, which includes a root node 202 representing the usage of the entire buffer. Consequently, root node 202 corresponds to the collective of all components that use the buffer. Each node in tree structure 200 represents usage of the buffer by a corresponding accounting element. Note that an accounting element refers to a component or a group of components that uses the buffer. For example, an accounting element can be a queue, a port, a group of queues (which can belong to the same port or different ports), a group of ports, a combination of queues and ports, etc. Depending on the usage scenario, buffer usage of individual components can be pooled differently. For example, buffer usage of all queues of a predetermined priority can be pooled together to form an accounting element, or buffer usage of a particular set of ports can be pooled together. The scope of this disclosure is not limited by the specific way the accounting elements are defined.

In the example shown in FIG. 2, root node 202 can be coupled to a number of nodes, including nodes 204, 206, and 208, which are children of root node 202. In other words, the total buffer usage can be divided into a number of groups, with each group (i.e., node) representing a portion of the buffer usage. Each node corresponds to an accounting element (e.g., a port or a group of ports) that consumes the specific portion of the buffer. In FIG. 2, the usage of the entire buffer can be divided among the children (e.g., nodes 204, 206, and 206) of root node 202.

A child node of root node 202 can be further coupled to a number of its own child nodes. For example, node 206 can be coupled to nodes 212, 214, and 216. This means that the particular buffer usage corresponding to node 206 can be further divided into subgroups, with each subgroup corresponding to a portion of this particular buffer usage. A subgroup can be further divided into smaller units. For example, node 212 can be coupled to leaf nodes 222 and 224, which are children of node 212. In this example, leaf nodes 222 and 224 correspond to smallest account units (e.g., physical queues), which cannot be further divided.

From FIG. 2, one can see that a node (other than the root node or a leaf node) can be both a parent node and a child node. In this disclosure, it is assumed that each child node has a single parent node and that each parent node can have one or more children.

In FIG. 2, each node is represented using a cylinder, with the total volume of the cylinder representing the largest possible buffer space (as indicated by a maximum byte limit) that the corresponding accounting element is able to reach with 100% utilization. The shaded region in each cylinder indicates the actual amount of buffer space used by the corresponding account element. Moreover, the dashed line on each cylinder marks the dynamic (or adaptive) limit of the buffer space that the corresponding accounting element is able to reach with 100% utilization. Such a dynamic or adaptive limit is determined based on the congestion state of the buffer. In other words, the amount of buffer space an accounting element can use decreases as the buffer gets more congested; or the adaptive utilization of the accounting element increases for using the same amount of buffer space.

Another way to look at tree structure 200 is to divide shared buffer 202 into smaller buffers, including child buffers 204, 206, and 208. Each child buffer can be associated with an accounting element, allowing the accounting element to use the space provided by the child buffer. A child buffer can be further divided. For example, buffer 206 can be divided among its children, including buffers 212, 214, and 216; and buffer 212 can be divided between buffers 222 and 224.

According to one aspect of the application, the adaptive utilization of an accounting element can be determined based on a number of factors, including both the base utilization of the accounting element and the adaptive utilization of the parent of the accounting element. Note that the base utilization of an accounting element is the ratio between the buffer space (e.g., the number of bytes) used by the accounting element and the largest possible buffer space (i.e., maximum byte limit) that the account element can consume. The maximum byte limit typically is a static value that can be assigned or configured based on a set of predetermined buffer management policies. For example, the system may assign a maximum allocation of buffer space to a particular queue. This particular queue can never access buffer space larger than the maximum allocation, even when the buffer is empty. The upper limit of buffer space this queue can access can change dynamically according to the congestion state of the buffer, or more particularly, according to the congestion state of the parent of the queue. When the parent buffer is congested, the upper limit of buffer space this queue can access decreases from the fixed maximum allocation. Hence, even though the amount of buffer space consumed by this queue remains unchanged, the buffer utilization (i.e., the consumed buffer space as a percentage of the dynamic upper limit of the available buffer space) of this queue increases when the parent buffer is congested.

Figure 3:
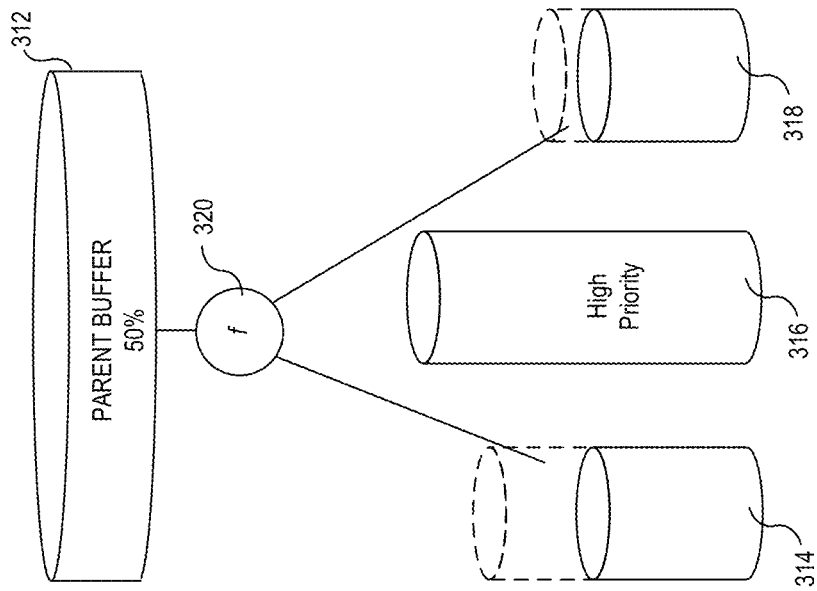
FIG. 3 illustrates the effect of the buffer utilization of a parent element on the dynamic buffer upper limits of the child elements, according to one aspect of the application.
Figure 3:
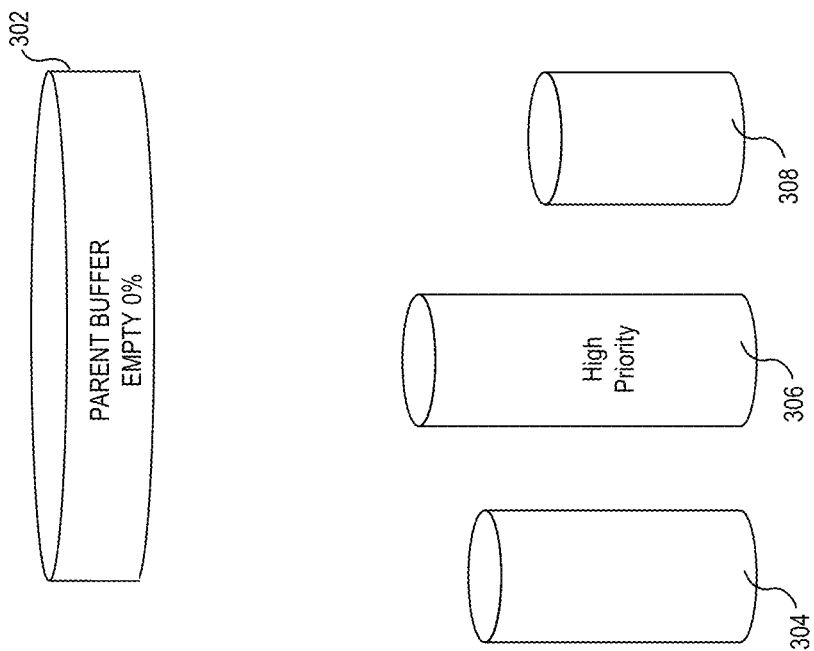

FIG. 3 illustrates the effect of the buffer utilization of a parent element on the dynamic buffer upper limits of the child elements, according to one aspect of the application. The left drawing in FIG. 3 shows a scenario where a parent buffer 302 is empty (0% occupied). The upper limits of the buffer space available to the child elements (including elements 304, 306, and 308) are not affected. Note that the maximum buffer spaces available to the different child elements are different. The right drawing shows a scenario where a parent buffer 312 is 50% occupied. Consequently, the upper limits of the buffer space available to child elements 314 and 318 are being pushed down for most child elements. However, because element 316 is a high priority element (e.g., a high priority queue), the upper limit of the buffer space available to child element 316 is not affected.

FIG. 3 also shows that the amount of reduction in the available buffer space for the child elements can be determined by a function 320. In addition to function 320 (which depends on the utilization of parent buffer 312), a bias value (not shown in FIG. 3) also affects the amount of reduction in the buffer space. According to one aspect, the bias value can be user-configurable. In one example, the bias value can be determined based on the priority of the child element. In the example shown in FIG. 3, high priority element 316 is not affected by the congestion state of parent buffer 312 as the result of a special bias.

Figure 4:
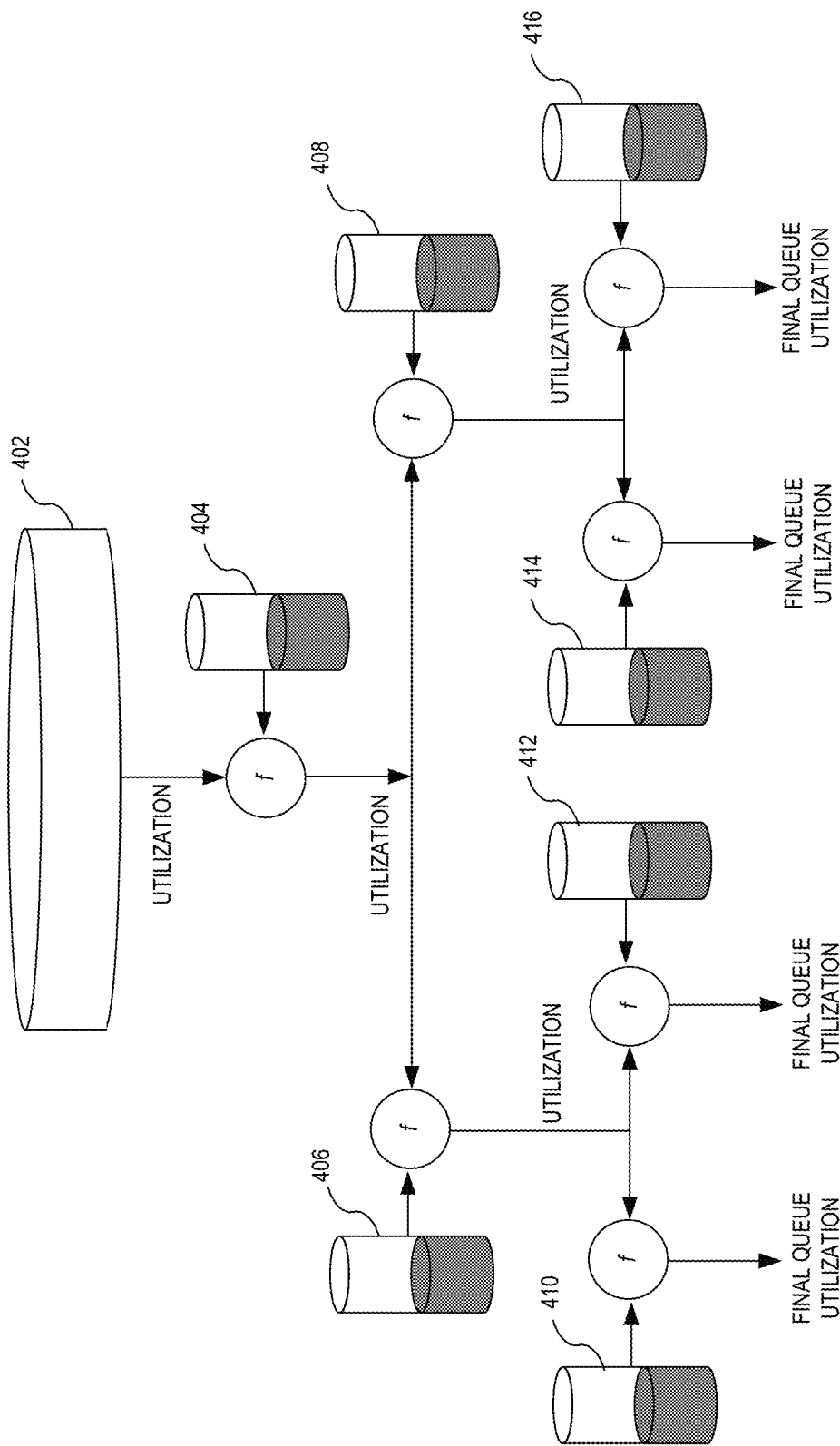
FIG. 4 illustrates the propagation of the effect of the congestion state of the buffer along the hierarchical accounting structure, according to one aspect of the application.

FIG. 4 illustrates the propagation of the effect of the congestion state of the buffer along the hierarchical accounting structure, according to one aspect of the application. In FIG. 4, the utilization of shared buffer 402 can affect effective or adaptive utilization of its child element 404. More specifically, the base buffer utilization of child element 404 can be modified by a function (e.g., f). Similarly, the adaptive utilization of element 404 can also affect utilization of its children, elements 406 and 408, and the utilization of elements 406 and 408 will correspondingly affect the utilization of their children. More specifically, buffer utilization of element 406 affects its child elements 410 and 412, and buffer utilization of element 408 affects its child elements 414 and 416. In this example, elements 410-416 are physical queues; hence, their adaptive utilizations are the final queue utilizations that are used by the admission-check logic to make admission decisions. Using element/queue 410 as an example, if its final queue utilization reaches a predetermined threshold (which can depend on the type of queue and the system configuration), incoming packets destined to queue 410 will be discarded. Note that other factors (e.g., bias) that affect the buffer utilization of each element are not shown in FIG. 4.

FIG. 3 and FIG. 4 show the effect of the parent's buffer utilization on the child's buffer utilization as a function.

According to one aspect of the invention, the buffer utilization of a child element can be obtained by modifying its base utilization by a certain amount. In one example, the amount of modification can be a function of the utilization of the parent and the utilization of the child. This function typically is non-linear.

It is possible to calculate on the fly the adaptive utilization of each accounting element (or queue) when making the queuing decision. However, considering that the packets are arriving at high speed, it is desirable to provide a mechanism that can determine the adaptive utilization much faster. According to one aspect of the application, the adaptive utilization of an accounting element can be determined using a lookup table, which can be implemented in hardware and can be significantly faster than a software-based solution. Moreover, using a lookup table also provides the ability to customize the output (i.e., utility of the child element) based on the input (i.e., base utility of the child element and utility of the parent element). There is no need to derive a fixed function. This provides network administrators with great flexibility in buffer management.

Figure 5:
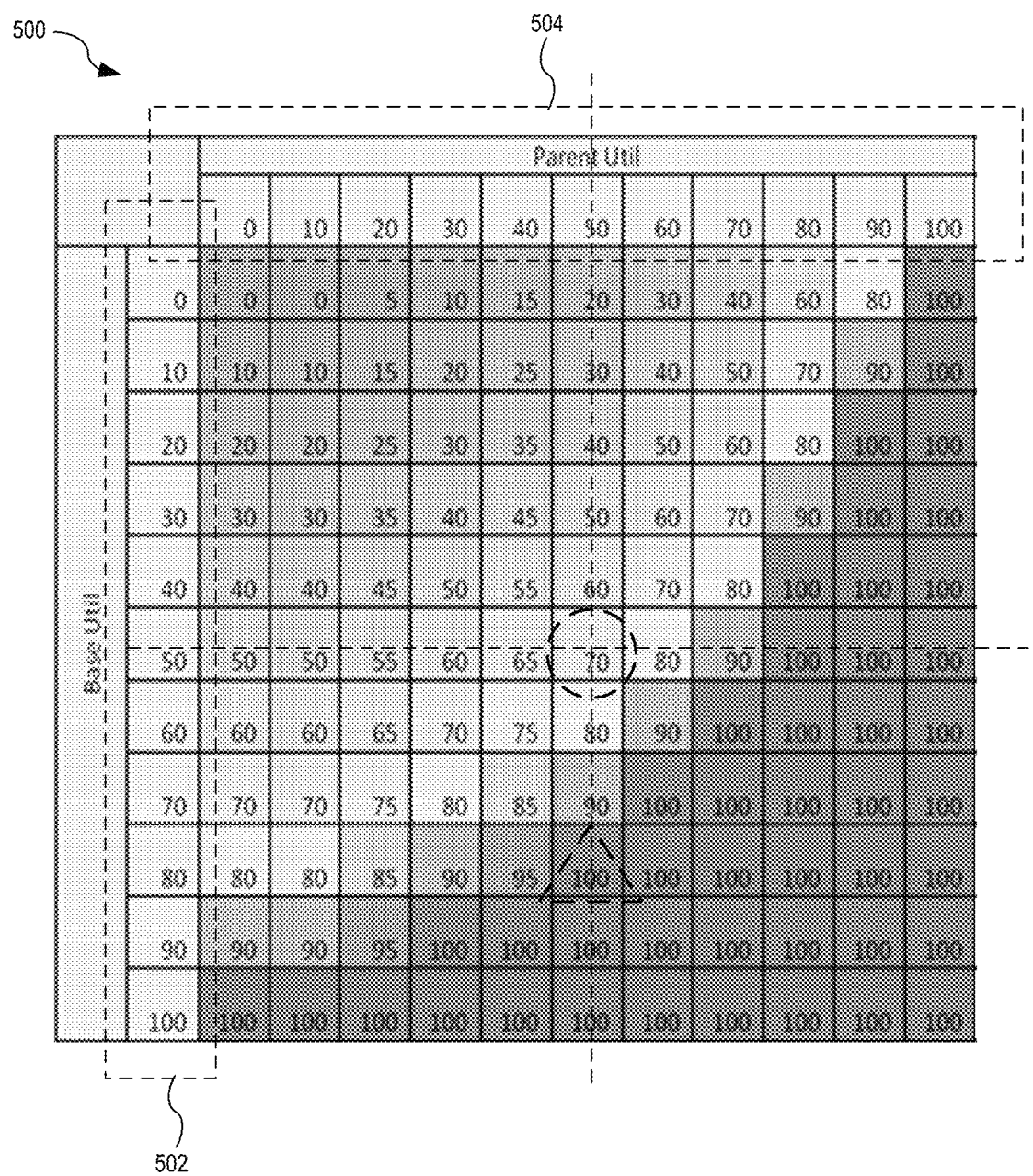
FIG. 5 illustrates an exemplary lookup table for determining the utilization of an accounting element, according to one aspect of the application.

FIG. 5 illustrates an exemplary lookup table for determining the utilization of an accounting element, according to one aspect of the application. FIG. 5 shows a table 500 that includes the utilizations (shown as percentages) of an element under different scenarios of base utilization-parent utilization combination. In table 500, the leftmost column, column 502, is the base utilization of the accounting element; and the top row, row 504, is the utilization of the parent element. The utilization of the element can be obtained from table 500 using the base utilization and the parent's utilization as indices. For example, if the base utilization of an element is 50% and its parent's utilization is also 50%, then according to table 500, the utilization of the element is 70%, as shown in the dashed circle. Similarly, when the parent utilization is 50%, the utilization of the element can be set at 100% (as shown by the dashed triangle), even when its base utilization is only 80%. In this situation, if the admission threshold is 100% buffer utilization, the switch will start to discard packets destined to this element (e.g., a particular queue on a particular port).

In the example shown in FIG. 5, the modification to the base utilization increases at the parent utilization increases. For example, when the parent utilization is 20%, the utilization of the element is 5% plus the base utilization (note that the utilization is capped at 100%); when the parent utilization is 30%, the utilization of the element is 10% plus the base utilization. This trend continues, until the 100% utilization causes 100% modification to the child utilization. Note that this is just a simple example. In practice, the effect of the parent's utilization on the child's utilization may be different than what is shown in FIG. 5. Also note that FIG. 5 shows a table with a much coarser scale (with each step being 10%) than what is practically needed. In one practical scenario, binary values from 0-127 may be used to represent the range between 0 and 100%. In such a scenario, each step can be about 0.78%, and the resulting table can have 128 columns and 128 rows.

From table 500 shown in FIG. 5, one can obtain the utilization of a child element according to its base utilization and its parent's utilization. However, table 500 does not reflect the influence of the bias value. As discussed previously, the bias value is another factor that can be used to adjust the utilization of an element. More specifically, the bias provides a mechanism to distinguish between accounting elements that may have the same maximum limit in accessible buffer space. For example, two queues of different priorities may have the same parent, meaning that modification based on the parent utilization is the same. However, given the same buffer space consumption, the buffer-management system may still determine that these two queues have different levels of utilization. This can be done by using the bias to further adjust (increase or decrease) the parent-utilization-based modification. A bias applied to higher priority queues can reduce the amount of modification to be made to the utilization of a child element based on the parent's utilization. In other words, the bias may reduce the effect of the parent's congestion state on the child element.

Figure 6:
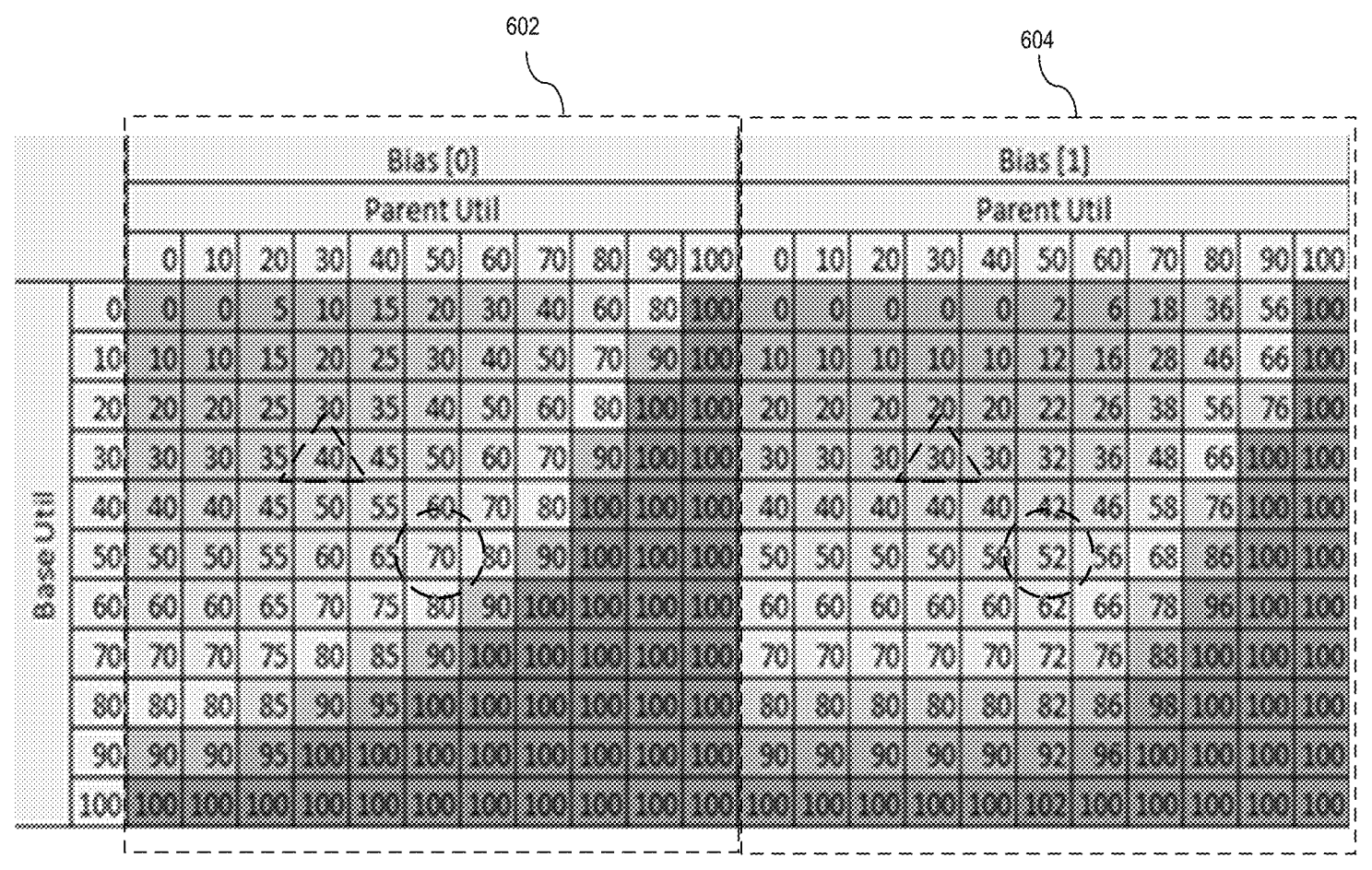

According to one aspect of the application, multiple lookup tables can be used to map the combination of the base utilization and the parent utilization to the effective or adaptive utilization, and the bias value of an accounting element can be used to select which table to use to perform the lookup. FIG. 6 illustrates exemplary lookup tables for different bias values, according to one aspect of the application. More specifically, FIG. 6 illustrates two lookup tables, table 602 and table 604. Each lookup table corresponds to a different bias value. In this example, lookup table 602 corresponds to a bias value of 0, and lookup table 604 corresponds to a bias value of 1.

In the particular example shown in FIG. 6, the higher bias value decreases the amount of modification made to the utilization of an element. For example, when there is no bias, if the base utilization of an element is 50% and its parent's utilization is also 50%, then according to table 602, the utilization of the element is 70%. The modification to the base utilization is 20%. However, when the bias value is 1, for the same 50% base utilization and 50% parent utilization, according to table 604, the utilization of the element is 52%. The modification to the base utilization is merely 2%, significantly less than the no-bias situation. Note that depending on the application, the user can define how the bias value may affect the modification.

FIG. 5 and FIG. 6 also show that there is no difference between the base utilization of the adaptive utilization in a significant portion of each table. For example, for tables 500 and 602, the first two columns show that no modification to the base utilization is made. Similarly, there is no modification to the base utilization in the first 5 columns of table 604. Consequently, the first two columns of table 602 are identical and the first five columns of table 604 are identical. This is because when the parent buffer is empty, it has little or no effect on the utilization of its child elements. In addition to the no-modification situation, there are also situations where the modifications to the base utilization are the same for different parent utilizations, although such situations are not shown in FIG. 5 and FIG. 6.

Considering a practical lookup table of size 128×128, there can be many groups of identical columns. Therefore, it makes sense to collapse the identical columns into a single column to reduce the size of the table. The reduced table size not only saves storage space but also increases the speed of table lookup. According to one aspect of the application, a table with 128 columns can be collapsed to 32 columns. More specifically, 128 parent utilization values (with 0 representing 0% and 127 representing 100%) can be translated to 32 different indices by mapping multiple parent utilization values to a single index. The 32 indices can be used to look up a table having 32 columns.

FIG. 7 shows an exemplary scenario where 128 parent utilization values are translated to 32 indices, according to one aspect of the application. The left column shows the 128 values of parent utilization and the right column shows the 32 indices. As shown in FIG. 7, parent utilization values 1-8 can be mapped to the same translated index 1, and similarly, parent utilization values 9-16 can be mapped to an index value 2. As the parent utilization value increases, the number of parent utilization values that can map to the same index decreases. For example, parent utilization values 71-74 map to index value 10, and parent utilization values 99-100 map to index value 17. This is because as the parent gets more congested, the slope of the modification curve becomes steeper. Using a higher precision mapping at the upper range can preserve the accuracy of the mapping table in that range.

Figure 8:
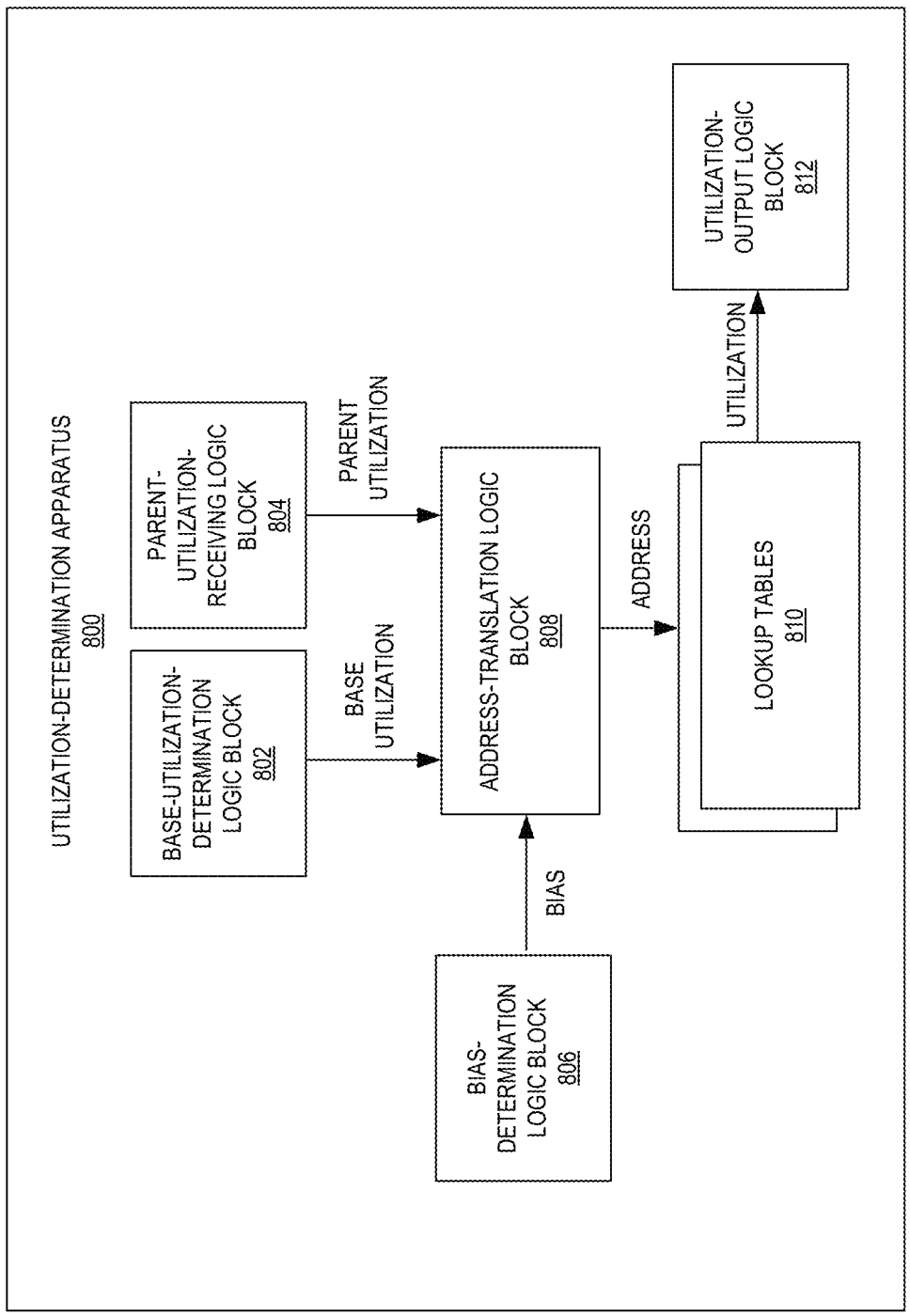
FIG. 8 illustrates an exemplary block diagram of an apparatus for determining the adaptive utilization of an element, according to one aspect of the application.

FIG. 8 illustrates an exemplary block diagram of an apparatus for determining the adaptive utilization of an element, according to one aspect of the application. Utilization-determination apparatus 800 includes a base-utilization-determination logic block 802, a parent-utilization-receiving logic block 804, a bias-determination logic block 806, an address-translation logic block 808, a number of lookup tables 810, and a utilization-output logic block 812.

Base-utilization-determination logic block 802 is responsible for determining the base utilization of the accounting element, which can be a queue, a port, a group of queues, a group of ports, a combination thereof, etc. Determining the base utilization of the accounting element can include computing the actual usage (e.g., in bytes) of the shared buffer space by the accounting element as a percentage of the maximum buffer space (e.g., in bytes) that can be consumed by this accounting element. Note that the maximum buffer space (also referred to as the maximum byte limit) is part of the system configuration and can typically be set during the initialization of the switch. Depending on the system configuration, different accounting elements can have different maximum byte limits. According to one aspect of the application, the base utilization can be dynamically updated each time a packet associated with the accounting element enters or exits the shared buffer. In one example, hardware logics can be used to perform the computation.

Parent-utilization-receiving logic block 804 receives the utilization value for its parent element. Such a value can be determined by an apparatus similar to apparatus 800. According to one aspect, apparatus 800 may be used to determine the utilization for all accounting elements in a switch. The determined utilization for a particular element can be stored and subsequently used to determine the utilizations of its child elements, as illustrated in FIG. 4.

Bias determination logic block can be used to determine a bias value associated with an accounting element. As discussed previously, the bias value is a static setting for an accounting element and can be used to adjust (amplify or reduce) the influence of the parent's utilization on the utilization of an accounting element. In one example, the bias value can be determined based on the priority of the accounting element. Accounting elements having different priorities (e.g., different priority queues) can have different bias values/settings. In addition to priority, other criteria can also be used to determine the bias settings. For example, a switch port connected to a different switch and a switch port connected to a local terminal device can have different bias settings. The number of bias values or settings can vary, depending on the configuration of the switch. For example, if the bias setting depends on priority and each port supports eight priority queues, there can be up to eight bias settings. It is also possible to have fewer than eight bias settings by allowing queues with different but similar priorities to have the same setting. For example, queues with priority classes 0 and 1 can have the same bias setting.

Address-translation logic block 808 can be responsible for translating (or converting) the various information, including the base utilization, the parent utilization, and the bias, into an address that can be used to perform lookup on lookup tables 810. Lookup tables 810 may be organized in many different ways, as long as they are indexed using the above information (e.g., the base utilization, the parent utilization, and the bias). In one example, each bias setting corresponds to a lookup table indexed using the base utilization and the parent utilization. In another example, lookup tables 810 in fact include a single large table, with each table entry corresponding to a unique table address.

Depending on how each of lookup tables 810 is organized and how the utilizations stored in the tables are determined, the lookup address can have different formats. FIG. 9 illustrates various exemplary formats of the lookup address, according to one aspect of the application. In the examples shown in FIG. 9, it is assumed that the total number of entries in the lookup tables is 4096 and the corresponding lookup address is 12 bits long.

The top address in FIG. 9 has its first five bits assigned to the child (i.e., the base utilization), the following four bits assigned to the parent (i.e., the parent utilization), and the last three bits used as bias bits. The exemplary tables shown in FIGS. 6-7 can be used to explain this particular implementation. The five child bits can provide 32 different base utilization indices for mapping the base utilization. These 32 indices can be mapped to 32 base utilization values evenly distributed between 0% and 100%, as shown in FIG. 6. On the other hand, the four parent utilization bits provide 16 different parent utilization indices. Unlike the base utilization indices, the parent utilization indices are mapped to parent utilization values that are not evenly distributed between 0% and 100%, because the lookup table has been collapsed to allow certain parent utilization indices to be mapped to multiple parent utilization values, as shown by the table in FIG. 7. The three bias bits can provide eight bias settings.

Depending on the required precision and constraint in resources, the number of entries in a lookup table can be more or fewer than 4096. The number of bits in the address can also be greater or less than 12. In addition, the numbers of bits assigned to index the base utilization and parent utilization can be different from what are shown in the top address. For example, it is possible to have six child bits, four parent bits, and two bias bits.

The middle address in FIG. 9 can be used to search a table without the bias setting. The middle address uses the first seven bits to index 128 base utilization values, and the last five bits to index 32 parent utilization values; there is no bias bit. Like the previous case, the 128 base utilization values can be evenly distributed between 0% and 100%, whereas the 32 parent utilization values are not evenly distributed. In this implementation, modification to the base utilization of each element depends on the parent's utilization. There is no consideration of priority.

The bottom address in FIG. 9 can be used in a different implementation where the modification to the base utilization of each element is governed by the bias setting, and the parent's utilization does not affect the utilization of the child. In FIG. 9, the first seven bits are used to index the 128 base utilization values, and the last five bits are used to index 32 bias values.

In addition to the examples shown in FIG. 9, the lookup address can have other formats. The number of total bits in each address, and the number and sequence of bits used to represent the different indices (e.g., the base utilization index, the parent utilization index, and the bias index) can be different than those shown in FIG. 9. For example, in all examples shown in FIG. 9, the beginning bits are used to index the base utilizations. It is also possible to use the beginning bits to index the parent utilization or the bias.

Returning to FIG. 8, the address generated by address-translation logic block 808 can be used to search lookup tables 810 to obtain the utilization of the element. Lookup tables 810 are configurable and store customized utilizations for each address value. Various techniques can be used to organize content of the tables and various techniques can be used to search the table. For example, lookup tables 810 can include a single table or multiple tables. When there are multiple tables (e.g., one table for each bias setting), performing the lookup can include identifying a table based on the bias bits. The scope of this disclosure is not limited by how the tables are organized and searched.

Utilization-output logic block 812 can output the determined utilization. The outputted utilization is the adaptive utilization of the accounting element and can be used by the admission check to determine whether an incoming packet should be discarded. If the admission check is based on the utilization at the physical queues, only the utilizations of the leaf nodes are outputted and sent to the admission check logic. For an intermediate node (i.e., a node between the root node and the leaf nodes), the outputted utilization can be sent back to apparatus 800 or a similar apparatus to be used to determine the utilization of its child node.

Figure 10:
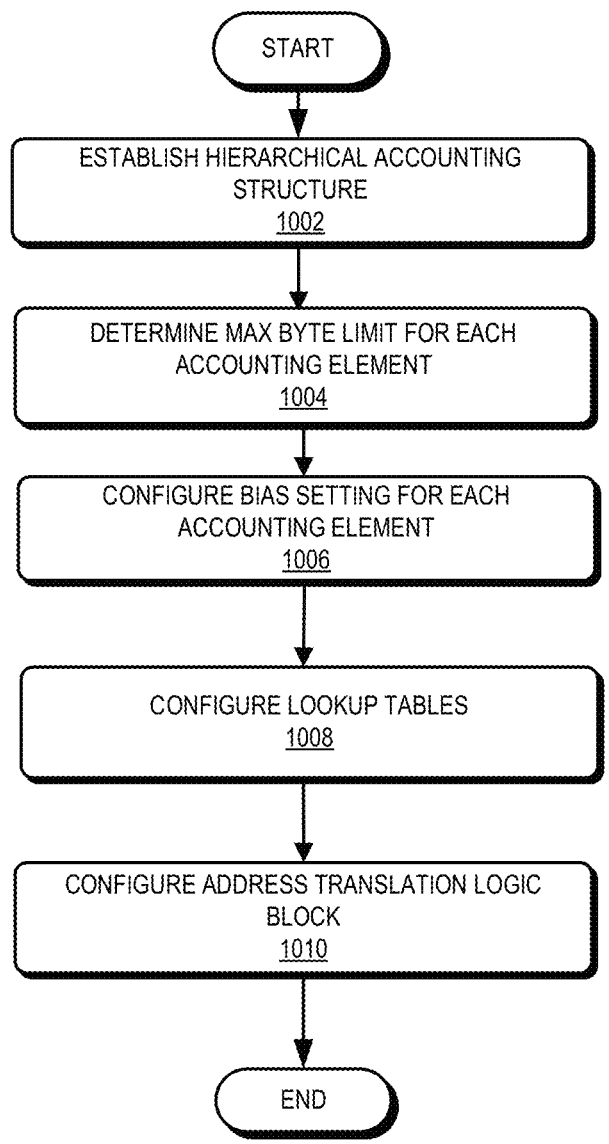
FIG. 10 provides a flowchart illustrating an exemplary process for configuring a switch to facilitate adaptive buffer management, according to one aspect of the application.

FIG. 10 provides a flowchart illustrating an exemplary process for configuring a switch to facilitate adaptive buffer management, according to one aspect of the application. During switch initialization, a hierarchical accounting structure is established for the switch (operation 1002). In one aspect, the hierarchical accounting structure can be constructed by control software running on the switch CPU. The control software can include a user interface allowing the user to manually configure the accounting structure, or the control software can automatically construct the hierarchical accounting structure based on a set of buffer management policies. The hierarchical accounting structure can be a tree structure, with the root node corresponding to the shared buffer and the leaf nodes corresponding to the individual queues storing packets. Each node corresponds to an accounting element that consumes buffer space. An accounting element can be an individual switch component (e.g., a queue or a port) or a combination of multiple switch components (e.g., a group of queues, a group of ports, or a combination thereof). The hierarchical relationship among the nodes can be determined based on the switch configuration and the buffer management objective. In one simple example, the root node corresponds to the shared buffer; child nodes of the root node correspond to individual ports on the switch; and child nodes of a respective port node correspond to individual queues for the port. In an alternative example, the root node corresponds to the shared buffer; child nodes of the root node correspond to priority queues of different priority classes; and child nodes of a respective priority-queue node correspond to individual queues of that priority class. Other hierarchical accounting structures are also possible.

Based on the hierarchical accounting structure, the system determines the maximum buffer space (i.e., the maximum byte limit) each accounting element is allowed to consume (operation 1004) and configures a bias setting for each accounting element (operation 1006). The maximum byte limit refers to the buffer space the accounting element is able to consume under an uncongested condition (e.g., the shared buffer being empty) before asserting 100% utilization. The bias setting allows the system to distinguish accounting elements that have the same parent and the same maximum byte limit but are affected differently by the congestion state of their parent. Depending on the type and priority, different accounting elements can have different maximum byte limits and different bias settings.

The system also configures the lookup tables based on the hierarchical accounting structure (operation 1008). Values in the lookup tables can reflect the effect of the congestion state of a parent element on the utilization of its child element and the effect of bias setting. The lookup tables can be configured (e.g., by the control software) based on a predetermined set of buffer-management policies or be configured manually by the system administrator. For example, the amount of modification to the base utilization of an accounting element depends on the congestion state of its parent, and such a relationship is typically non-linear and can be customized by the user. If the buffer-management policies emphasize priority, the bias settings may play a bigger role (e.g., the parent's influence on the child nodes may be significantly different for child nodes with different bias settings). On the other hand, the lookup tables may not include the different bias settings, if the buffer-management policies allow the parent to influence its children the same way regardless of priority. According to one aspect, configuring the lookup tables can also include collapsing multiple columns of a table into a single column. This allows multiple parent utilization values to be represented using a single value or index.

Depending on the configurations of the lookup tables, the system can configure the address-translation logic block (operation 1010). The configured address-translation logic block can generate a lookup address based on various inputs, including the base utilization of an element, the utilization of the element's parent, and the bias setting of the element. The length of the address depends on the size of the table. The address should be sufficiently long to ensure each address is mapped to a unique table entry. The number of bits in the address assigned to each input and the bit locations depend on the configuration of the tables as well as the lookup schemes.

Figure 11:
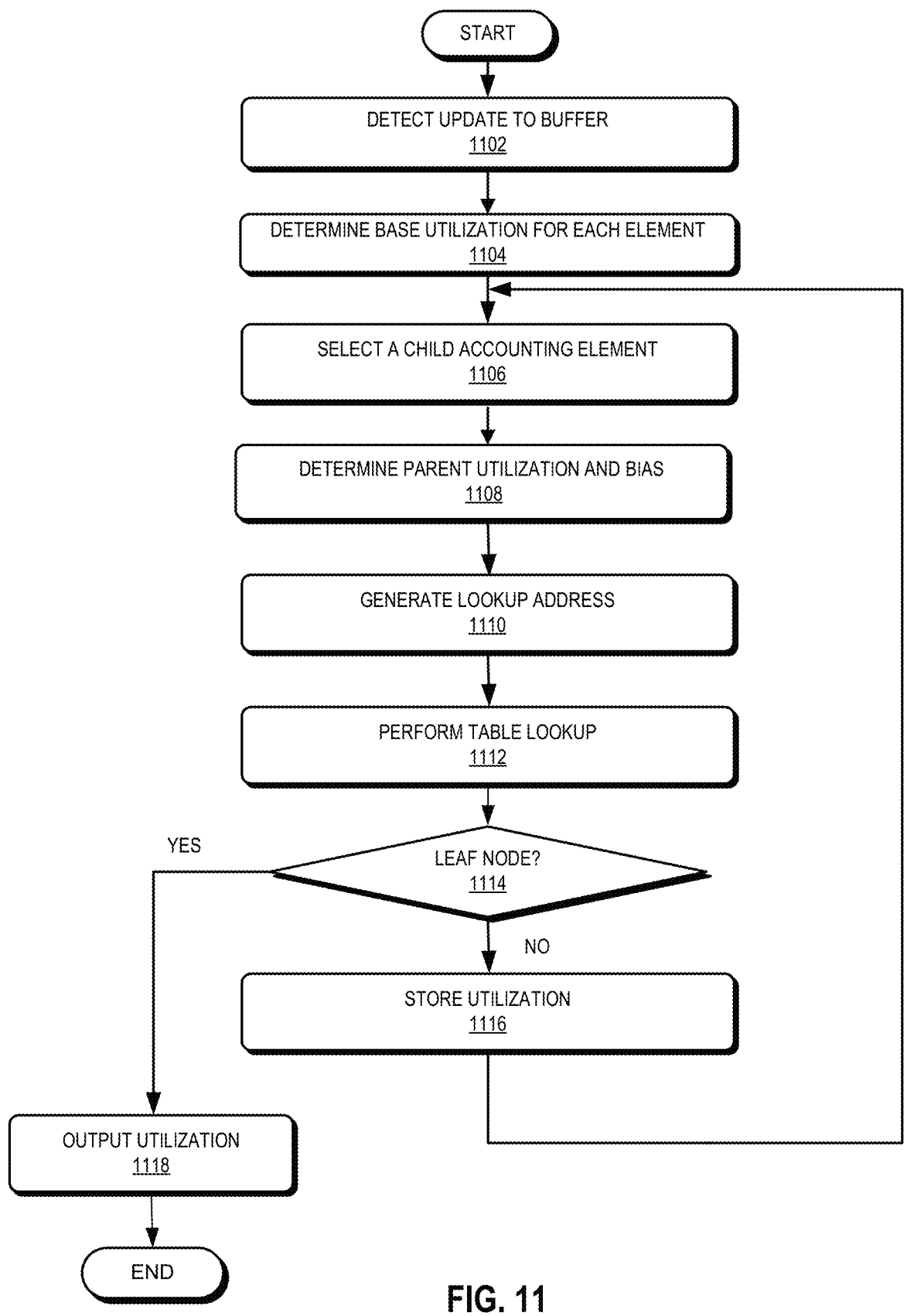
FIG. 11 illustrates an exemplary process for determining the utilizations of various accounting elements in a switch, according to one aspect of the application.

FIG. 11 illustrates an exemplary process for determining the utilizations of various accounting elements in a switch, according to one aspect of the application. During operation, the system detects that an update occurs in the shared buffer (operation 1102). The buffer is updated when packets enter or exit the buffer. In response to the update, the system determines, for each accounting element, the base utilization (operation 1104). Because the base utilization of an accounting element changes when packets associated with the accounting element enter or exit the buffer, the system may only need to update the base utilization of the accounting elements associated with the packets that enter or exit the buffer. For example, when packets enter or exit a particular queue, the base utilization of the particular queue will need to be updated.

The system selects a child accounting element (operation 1106). According to one aspect, at the beginning, the system can first select one of the child elements of the root node of the hierarchical accounting structure. The system determines the parent utilization and/or bias setting of the selected element (operation 1108).

The system can then generate a table lookup address based on the base utilization of the selected element, the effective or adaptive utilization of its parent, and the bias setting of the selected element (operation 1110). Depending on the configuration of the lookup tables, in addition to bits indexing the base utilization, the lookup address may include bits indexing the parent utilization, or bits indexing the bias setting, or both. In one embodiment, when generating the lookup address, the system may first need to translate the parent utilization. Such translation can condense a large scale range (e.g., a scale comprising 128 different values) into a scale with less precision (e.g., a scale comprising 32 different values). This allows multiple parent utilization levels to be mapped using a single index, thus reducing the size of the lookup tables needed for storing the utilization.

The system performs the table lookup based on the generated address to obtain the utilization of the element (operation 1112). In one example, there are multiple lookup tables, one for each bias setting. Performing the lookup can include extracting the bias bits from the address and determining, from the multiple tables, which table to use for the lookup. Once the table is determined, the system can use the rest of the address bits, including the ones for the base utilization and the ones for the parent utilization, to look up the determined table to obtain the utilization of the selected element. If there is only one table, the system can directly use the lookup address to perform the lookup.

The system then determines if the element is a leaf node (operation 1114). If not, the element is a parent of other element(s), and the system stores the utilization (operation 1116) and selects one of its children as a selected accounting element (operation 1106). If the element is a leaf node, the system outputs the utilization obtained from the lookup table (operation 1118) and the process ends. The obtained utilization can be used by the admission check logic to determine whether to admit an incoming packet to the buffer or deny the packet. In addition to using the utilization of the leaf nodes for admission check, in alternative examples, the utilization of certain parent nodes (e.g., a particular port or port group) may also be used at the admission check stage to determine whether to admit or deny an incoming packet.

The operations shown in FIG. 11 can be used to determine the utilizations of all accounting elements along a path extending from the root node to a particular leaf node. The same process can be used to determine the utilizations of accounting elements along a different path. Various tree traversal techniques can be used to traverse the hierarchical accounting structure. The scope of this disclosure is not limited by the tree traversal technique.

Using the parent utilization and the bias setting to determine the utilization of a particular element can allow the buffer management system to adaptively adjust the amount of buffer space that can be consumed by individual accounting elements based on what else is occupying the buffer. This can increase the buffer efficiency by preventing certain accounting elements (e.g., a port or a group of queues) to occupy too much buffer space. Because the congestion state of the buffer changes dynamically as packets enter and exit the buffer, the utilizations of the various levels of accounting elements also need to be updated dynamically. Using the hardware-based table lookup mechanism to determine the utilizations of accounting elements can ensure high speed.

Figure 12:
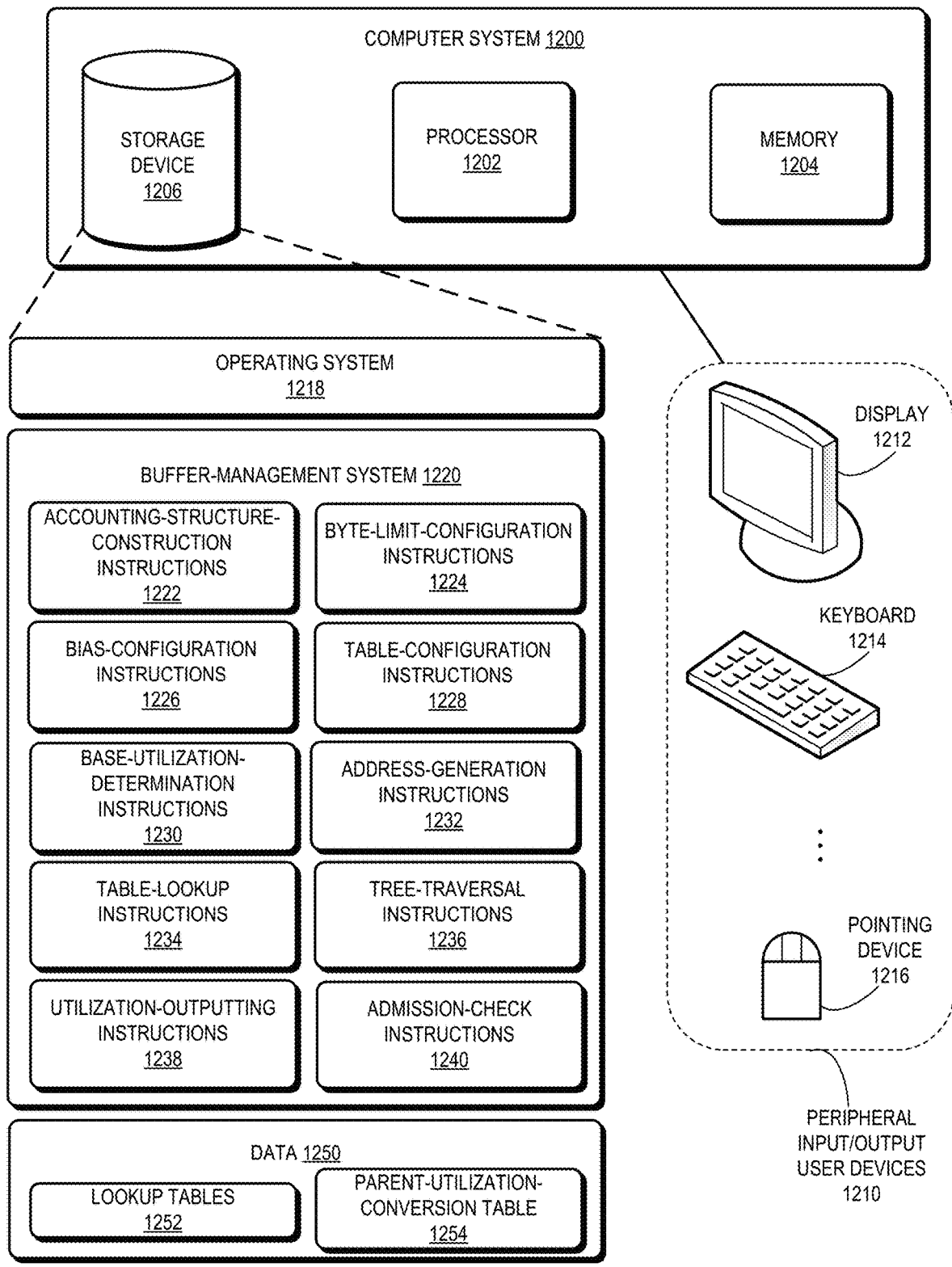
FIG. 12 illustrates an exemplary computer system that facilitates adaptive determination of buffer utilizations, according to one aspect of the application.

FIG. 12 illustrates an exemplary computer system that facilitates adaptive determination of buffer utilizations, according to one aspect of the application. Computer system 1200 includes a processor 1202, a memory 1204, and a storage device 1206. Furthermore, computer system 1200 can be coupled to peripheral input/output (I/O) user devices 1210, e.g., a display device 1212, a keyboard 1214, and a pointing device 1216. Storage device 1206 can store an operating system 1218, a buffer-management system 1220, and data 1250.

Buffer-management system 1220 can include instructions, which when executed by computer system 1200, can cause computer system 1200 or processor 1202 to perform methods and/or processes described in this disclosure. Specifically, buffer-management system 1220 can include instructions for constructing a hierarchical accounting structure (accounting-structure-construction instructions 1222), instructions for configuring the maximum byte limit for each accounting element (byte-limit-configuration instructions 1224), instructions for configuring the bias setting for each accounting element (bias-configuration instructions 1226), instructions for configuring the lookup tables (table-configuration instructions 1228), instructions for determining the base utilizations of individual accounting elements (base-utilization-determination instructions 1230), instructions for generating a table lookup address (address-generation instructions 1232), instructions for performing the table lookup to determine adaptive utilizations of individual accounting elements (table-lookup instructions 1234), instructions for traversing the hierarchical accounting structure (tree-traversal instructions 1236), instructions for outputting the adaptive utilizations (utilization-outputting instructions 1238), and instructions for performing admission check on packets based on utilizations of the accounting elements (admission-check instructions 1240). Data 1250 can include the lookup tables 1252 and parent-utilization-conversion table 1254.

In general, this disclosure provides a system and method for managing the buffer and queuing system on a switch. More specifically, when making a queuing or packet-admission decision, the system considers the adaptive utilization of an account element, which can correspond to a single component or a group of components on the switch. The adaptive utilization is not only determined based on the actual buffer space consumed by the element but also depends on the overall congestion state of the buffer. To determine the adaptive buffer utilizations of individual components in the switch (e.g., individual queues or ports), the system organizes the buffer usage into a hierarchical accounting structure/tree, with each node in the accounting structure corresponding to an accounting element. Other than the root node, each node in the tree has a single parent node, and each parent node has one or more child nodes. A parent accounting element can be a collection of multiple child elements that share certain same attributes. The adaptive utilization of an accounting element can be determined by both the base utilization of the element and the utilization of its parent. The influence of the parent utilization on the child utilization can also be adjusted based on a bias setting associated with the child node. The bias setting allows the system to evaluate utilizations based on importance or priority of each accounting element. To ensure high speed, the adaptive utilization can be obtained by performing table lookups. The system can pre-configure a number of tables to store the adaptive utilization values for different scenarios (i.e., for different combinations of the child utilization, the parent utilization, and the bias). To save storage space, the lookup tables can also be collapsed to allow multiple parent utilization levels to be mapped to a same index. Each time the buffer is updated, the system also needs to update the adaptive utilizations for the accounting elements, which can involve generating a table lookup address for each element and subsequently performing the table lookup. The adaptive utilization of the accounting elements can then be used to make queuing decisions.

One aspect of the instant application provides a system and method for managing a switch buffer. During operation, the system establishes a hierarchical accounting structure to determine utilizations of different elements of a buffer on the switch. The hierarchical accounting structure comprises one or more parent elements, and each parent element is associated with one or more child elements. The system determines a base utilization of a child element based on an amount of buffer space allocated to the child element and an amount of buffer space used by the child element, and determines an adaptive utilization of the child element based at least on the base utilization of the child element and utilization congestion state of a corresponding parent element. Determining the adaptive utilization of the child element comprises performing a table lookup operation. The system then stores a received packet associated with the child element in the buffer in response to the adaptive utilization of the child element being less than a predetermined threshold.

In a variation on this aspect, the elements comprise one or more of: a queue, a group of queues, a port, a group of ports, and a combination thereof.

In a variation on this aspect, the system configures a lookup table, each entry in the lookup table being indexed by a base utilization of the child element and an adaptive utilization of the corresponding parent element.

In a further variation, configuring the lookup table comprises determining an influence of a congestion state of the parent element on the child element and generating the adaptive utilization of the child element by modifying the base utilization of the child element based on the determined influence.

In a further variation, configuring the lookup table further comprises: determining a bias setting associated with the child element; and adjusting the modification to the base utilization according to the bias setting.

In a further variation, the bias setting is determined based on a priority or type of traffic associated with the child element.

In a further variation, the system configures multiple lookup tables, with different lookup tables corresponding to different bias settings.

In a further variation, the system generates a lookup address comprising a first number of bits reflecting the base utilization of the child element and a second number of bits reflecting the adaptive utilization of the corresponding parent element.

In a further variation, configuring the lookup table comprises combining multiple identical entries to form a single entry, the multiple identical entries corresponding to a same base utilization of the child element and different adaptive utilizations of the corresponding parent element.

In a further variation, the system maps the different adaptive utilizations of the corresponding parent element to a same parent utilization index that is used during the table lookup operation.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method for managing a switch buffer, comprising:
   establishing, for the switch, a hierarchical accounting structure to determine utilizations of different elements of the buffer on the switch, wherein the hierarchical accounting structure comprises one or more parent elements, and wherein each parent element is associated with one or more child elements;
   determining a base utilization of a child element based on an amount of buffer space allocated to the child element and an amount of buffer space used by the child element;
   determining an adaptive utilization of the child element based at least on the base utilization of the child element and a congestion state of a corresponding parent element, wherein determining the adaptive utilization of the child element comprises performing a table lookup operation; and
   storing a packet associated with the child element in the buffer in response to the adaptive utilization of the child element being less than a predetermined threshold.

2. The method of claim 1, wherein the elements comprise one or more of:
   a queue;
   a group of queues;
   a port;
   a group of ports; and
   a combination thereof.

3. The method of claim 1, further comprising configuring a lookup table, wherein each entry in the lookup table is indexed by a base utilization of the child element and an adaptive utilization of the corresponding parent element.

4. The method of claim 3, wherein configuring the lookup table comprises determining an influence of a congestion state of the parent element on the child element and generating the adaptive utilization of the child element by modifying the base utilization of the child element based on the determined influence.

5. The method of claim 4, wherein configuring the lookup table further comprises:
   determining a bias setting associated with the child element; and
   adjusting the modification to the base utilization according to the bias setting.

6. The method of claim 3, wherein the bias setting is determined based on priority or type of traffic associated with the child element.

7. The method of claim 5, further comprising configuring multiple lookup tables, with different lookup tables corresponding to different bias settings.

8. The method of claim 3, further comprising generating a lookup address comprising a first number of bits reflecting the base utilization of the child element and a second number of bits reflecting the adaptive utilization of the corresponding parent element.

9. The method of claim 3, wherein configuring the lookup table comprises combining multiple identical entries to form a single entry, wherein the multiple identical entries correspond to a same base utilization of the child element and different adaptive utilizations of the corresponding parent element.

10. The method of claim 9, further comprising mapping the different adaptive utilizations of the corresponding parent element to a same parent utilization index that is used during the table lookup operation.

11. A switch, comprising:
    an accounting-structure-establishing logic block to establish a hierarchical accounting structure to determine utilizations of different elements of a buffer on the switch, wherein the hierarchical accounting structure comprises one or more parent elements, and wherein each parent element is associated with one or more child elements;
    a base-utilization-determination logic block to determine a base utilization of a child element based on an amount of buffer space allocated to the child element and an amount of buffer space used by the child element;
    an adaptive-utilization-determination logic block to determine an adaptive utilization of the child element based at least on the base utilization of the child element and a congestion state of a corresponding parent element, wherein the adaptive-utilization-determination logic determines the adaptive utilization of the child element by performing a table lookup operation; and
    an admission-check logic block to determine whether to store a packet associated with the child element in the buffer based on the adaptive utilization of the child element.

12. The switch of claim 11, wherein the elements comprise one or more of:
    a queue;
    a group of queues;
    a port;
    a group of ports; and
    a combination thereof.

13. The switch of claim 11, further comprising a table-configuration logic block to configure a lookup table, wherein each entry in the lookup table is indexed by a base utilization of the child element and an adaptive utilization of the corresponding parent element.

14. The switch of claim 13, wherein the table-configuration logic block configures the lookup table by determining an influence of a congestion state of the parent element on the child element and generating the adaptive utilization of the child element by modifying the base utilization of the child element based on the determined influence.

15. The switch of claim 14, wherein the table-configuration logic block further configures the lookup table by:
    determining a bias setting associated with the child element; and
    adjusting the modification to the base utilization according to the bias setting.

16. The switch of claim 13, wherein the bias setting is determined based on a priority or type of traffic associated with the child element.

17. The switch of claim 15, wherein the table-configuration logic block is to configure multiple lookup tables, with different lookup tables corresponding to different bias settings.

18. The switch of claim 13, further comprising an address-generation logic block to generate a lookup address comprising a first number of bits reflecting the base utilization of the child element and a second number of bits reflecting the adaptive utilization of the corresponding parent element.

19. The switch of claim 13, wherein the table-configuration logic block is to combine multiple identical entries to form a single entry, wherein the multiple identical entries correspond to a same base utilization of the child element and different adaptive utilizations of the corresponding parent element.

20. The switch of claim 19, wherein the adaptive-utilization-determination logic block is to map the different adaptive utilizations of the corresponding parent element to a same parent utilization index that is used during the table lookup operation.

\* \* \* \* \*